(12) United States Patent
Ghosh et al.

(10) Patent No.: US 11,775,713 B2
(45) Date of Patent: Oct. 3, 2023

(54) REGISTER TRANSFER LEVEL NAVIGATION MICROSERVICES AND INSTRUMENTATION FOR CLOUD-NATIVE ELECTRONIC DESIGN AUTOMATION (EDA) PLATFORMS

(71) Applicant: International Business Machines Corporation, Armonk, NY (US)

(72) Inventors: Shiladitya Ghosh, Bangalore (IN); Balaji Pulluru, Tirupati (IN); Pradeep Joy, Thrissur (IN); Arun Joseph, Kadugodi (IN); Wolfgang Roesner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/487,423

(22) Filed: Sep. 28, 2021

(65) Prior Publication Data
US 2023/0103565 A1 Apr. 6, 2023

(51) Int. Cl.
*G06F 30/327* (2020.01)
*G06F 30/12* (2020.01)
(Continued)

(52) U.S. Cl.
CPC ............ *G06F 30/327* (2020.01); *G06F 30/12* (2020.01); *G06F 2119/02* (2020.01); *G06F 2119/06* (2020.01)

(58) Field of Classification Search
CPC .................................................. G06F 30/327
(Continued)

(56) References Cited

U.S. PATENT DOCUMENTS 9,064,068 B1 *  6/2015 Fox ..................... G06F 30/331
2019/0089597 A1    3/2019 Pathak
(Continued)

FOREIGN PATENT DOCUMENTS

CN    102054100 A    5/2011
CN    109739705 A    5/2019
(Continued)

OTHER PUBLICATIONS

WebSocket—Wikipedia, 9 pages, downloaded Sep. 23, 2021, https://en.wikipedia.org/wiki/WebSocket.
(Continued)

*Primary Examiner* — Eric D Lee
(74) *Attorney, Agent, or Firm* — Erik Johnson; Otterstedt & Kammer PLLC

(57) ABSTRACT

To increase the efficiency of electronic design automation, a register transfer level debug application client entity requests, from a register transfer level source navigator server, combined register transfer level and hardware aspect metadata including debug instrumentation. The register transfer level debug application client entity receives, from the register transfer level source navigator server, the combined register transfer level and hardware aspect metadata including the debug instrumentation. The register transfer level debug application client entity transforms the combined register transfer level and hardware aspect metadata including the debug instrumentation. The register transfer level debug application client entity renders the transformed combined register transfer level and hardware aspect metadata including the debug instrumentation.

17 Claims, 10 Drawing Sheets

(51) Int. Cl.
G06F 119/06 (2020.01)
G06F 119/02 (2020.01)

(58) Field of Classification Search
USPC .......................................................... 716/104
See application file for complete search history.

(56) References Cited

U.S. PATENT DOCUMENTS

| | | |
|---|---|---|
| 2019/0116095 A1 | 4/2019 | Huang |
| 2020/0153629 A1 | 5/2020 | Yitbarek |
| 2020/0175131 A1 | 6/2020 | Schardt |

FOREIGN PATENT DOCUMENTS

| | | |
|---|---|---|
| CN | 112567375 A | 3/2021 |
| CN | 112817872 A | 5/2021 |

OTHER PUBLICATIONS

Register-transfer level—Wikipedia, 6 pages, downloaded Sep. 19, 2021 https://en.wikipedia.org/wiki/Register-transfer_level.
IBM, What are Microservices? | IBM 15 pages downloaded Sep. 23, 2021, https://www.ibm.com/cloud/learn/microservices.
Aspect-oriented programming—Wikipedia, 18 pages, downloaded Sep. 19, 2021, https://en.wikipedia.org/wiki/Aspect-oriented_programming.
IBM, Cloud Native | IBM 10 pages downloaded Sep. 23, 2021, https://www.ibm.com/cloud/learn/cloud-native.
Anonymous, RTLvision PRO, 8 pages downloaded Feb. 20, 2023 from https://www.concept.de/RTLvision.html.
Jelemenská K, Hyben M, Jančiga T, Kardoš M, Maron L, Süll Z. Extensible framework for graphical representation of HDL models and Simulation Reguīts. In2013 Africon Sep. 9, 2013 (pp. 1-5). IEEE. abstract only 3 pages.
Lu, Zheng, Abdulhadi Shoufan, and Guido Rößling. "A Platform for VHDL Visualization." 5 pages at least as early as May 18, 2021.
Jelemenská K, Nosál M, Čičák P. Visualization of verilog digital systems models. InEmerging Trends in Computing, Informatics, Systems Sciences, and Engineering 2013 (pp. 805-818). Springer New York.
Anonymous, Sigasi Studio Views. 18 pages downloaded from https://insights.sigasi.com/manual/views/ Feb. 20, 2023.
Kim NH, Kim KS, Choi KM, Kong JT. RightTopologizer: an efficient schematic generator for multi-level optimization. InProceedings of 13th Annual IEEE International ASIC/SOC Conference (Cat. No. 00TH8541) Sep. 13, 2000 (pp. 387-391). IEEE. abstract only 2 pages.
Safieddine MH, Zaraket FA, Kanj R, El-Zein A, Roesner W. Verification at RTL using separation of design concerns. IEEE Transactions on Computer-Aided Design of Integrated Circuits and Systems. Jun. 18, 2018;38(8):1529-42. Abstract only 2 pages.
Siemens, Questa Visualizer Debug, 10 pages downloaded Feb. 20, 2023 from https://eda.sw.siemens.com/en-US/ic/visualizer-debug/.
Safieddine MH, Zaraket FA, Kanj R, Elzein A, Roezner W. Methodology for separation of design concerns using conservative RTL Flipflop inference. InProc. Design Verification Conf. Exhibit. Mar. 2015. 8 pages.
W. Roesner, "Aspect-Oriented Design—Optimizing SoC Verification via Separation of Concerns," in 51st Design Automation Conference, Austin, 2014 21 pages.
Wolfgang Roesner, "Software Methods meet Large-Scale System-on-a-Chip Design", TCE 2015 28 pages.
Arun Joseph, Sampath Baddam, Shashidhar Reddy, Wolfgang Roesner IBM Systems 54th DAC Jun. 18-22, 2017 Austin, TX 6 pages.
Peter Mell and Timothy Grance, The NIST Definition of Cloud Computing, NIST Special Publication 800-145, cover, pages i-iii, 1-3, Sep. 2011.
National Intellectual Property Administration, PRC(ISA/CN), PCT/CN2022/120803, Search Report and the Written Opinion, dated Dec. 5, 2022. pp. 9.

* cited by examiner

REGISTER TRANSFER LEVEL NAVIGATION MICROSERVICES AND INSTRUMENTATION FOR CLOUD-NATIVE ELECTRONIC DESIGN AUTOMATION (EDA) PLATFORMS

BACKGROUND

The present invention relates to the electrical, electronic, and computer arts, and more specifically, to semiconductor Electronic Design Automation (EDA) and the like.

In VLSI (very large-scale integration) digital design, fabricated devices conventionally include millions of transistors implementing hundreds of storage devices, functional logic circuits, and the like. EDA involves the use of software tools for designing electronic systems such as integrated circuits (ICs) (e.g., VLSI circuits) and printed circuit boards. The designs are often segmented or partitioned into sub-blocks (such as cores, units, macros, sub-hierarchies, and the like) to make the design process more manageable.

In the microprocessor design cycle, there is an ever increasing need to reduce time from hardware design to general availability of the systems. This motivates the desire to have minimal issues and faster turnaround time. Debugging hardware designs is challenging. Next-generation high-performance microprocessors are now designed using a stepwise refinement implementation flow. Here, the normalized (NMZ) register transfer level (RTL) design abstraction, which captures the design intent, goes through a set of automated transforms for the creation of a physical design optimized (PD) RTL. This optimized design then goes through physical design and is ultimately manufactured.

SUMMARY

Principles of the invention provide techniques for register transfer level navigation microservices and instrumentation for cloud-native EDA platforms for selective and cross aspect RTL debug in aspect-oriented hardware designs. In one aspect, an exemplary method for increasing the efficiency of electronic design automation includes a register transfer level debug application client entity requesting, from a register transfer level source navigator server, combined register transfer level and hardware aspect metadata including debug instrumentation; the register transfer level debug application client entity receiving, from the register transfer level source navigator server, the combined register transfer level and hardware aspect metadata including the debug instrumentation; the register transfer level debug application client entity transforming the combined register transfer level and hardware aspect metadata including the debug instrumentation; and the register transfer level debug application client entity rendering the transformed combined register transfer level and hardware aspect metadata including the debug instrumentation.

In another aspect, an exemplary computer includes a memory; a non-transitory computer readable medium including computer executable instructions; and at least one processor, coupled to the memory and the non-transitory computer readable medium, and operative to increase the efficiency of electronic design automation by: instantiating a register transfer level debug application client entity; the register transfer level debug application client entity requesting, from a register transfer level source navigator server, combined register transfer level and hardware aspect metadata including debug instrumentation; the register transfer level debug application client entity receiving, from the register transfer level source navigator server, the combined register transfer level and hardware aspect metadata including the debug instrumentation; the register transfer level debug application client entity transforming the combined register transfer level and hardware aspect metadata including the debug instrumentation; and the register transfer level debug application client entity rendering the transformed combined register transfer level and hardware aspect metadata including the debug instrumentation.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. Some embodiments may not have these potential advantages and these potential advantages are not necessarily required of all embodiments. For example, one or more embodiments improve the technological process of designing integrated circuits by enhancing the debugging of hardware designs.

These and other features and advantages of the present invention will become apparent from the following detailed description of illustrative embodiments thereof, which is to be read in connection with the accompanying drawings.

DETAILED DESCRIPTION

Figure 1:
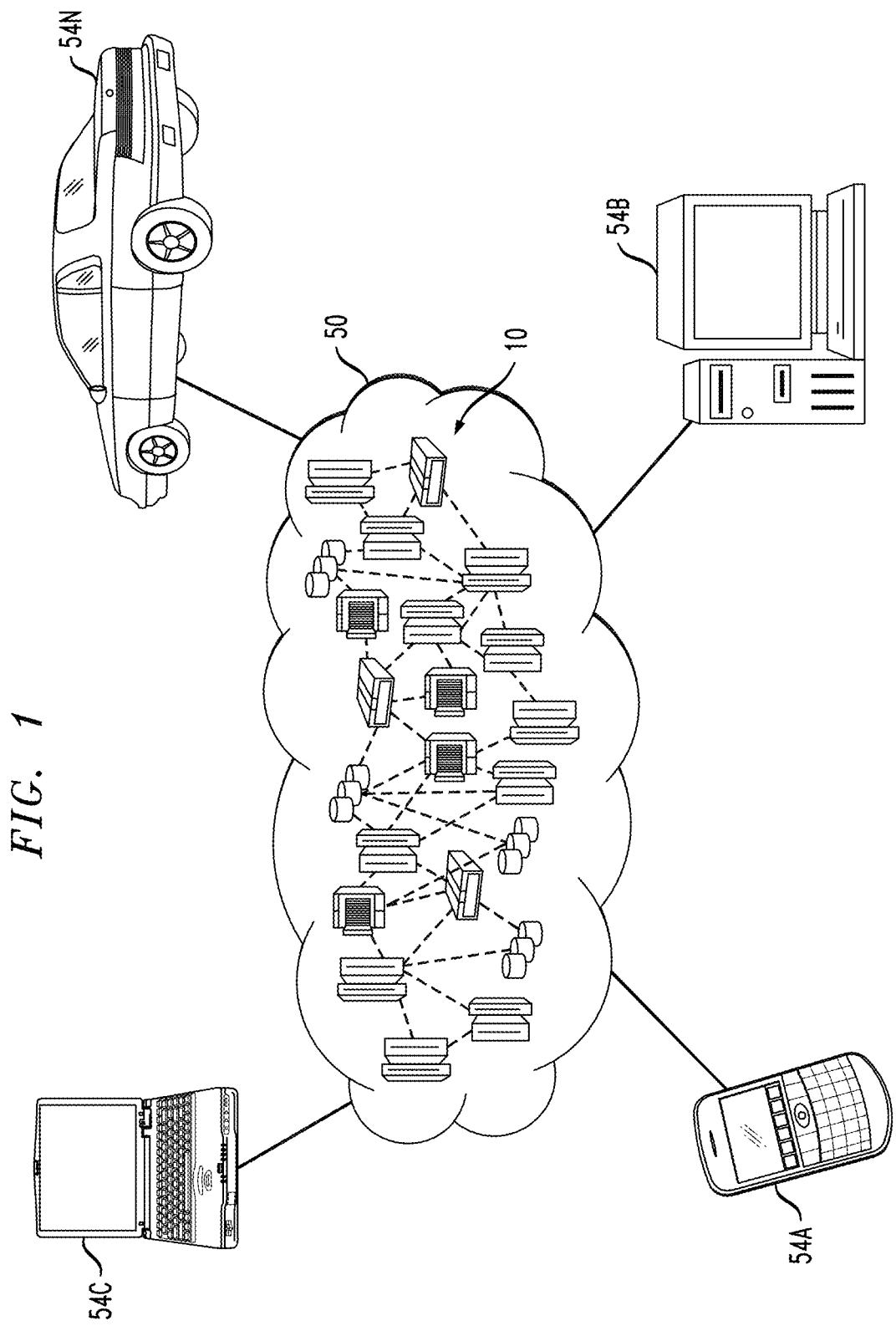
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
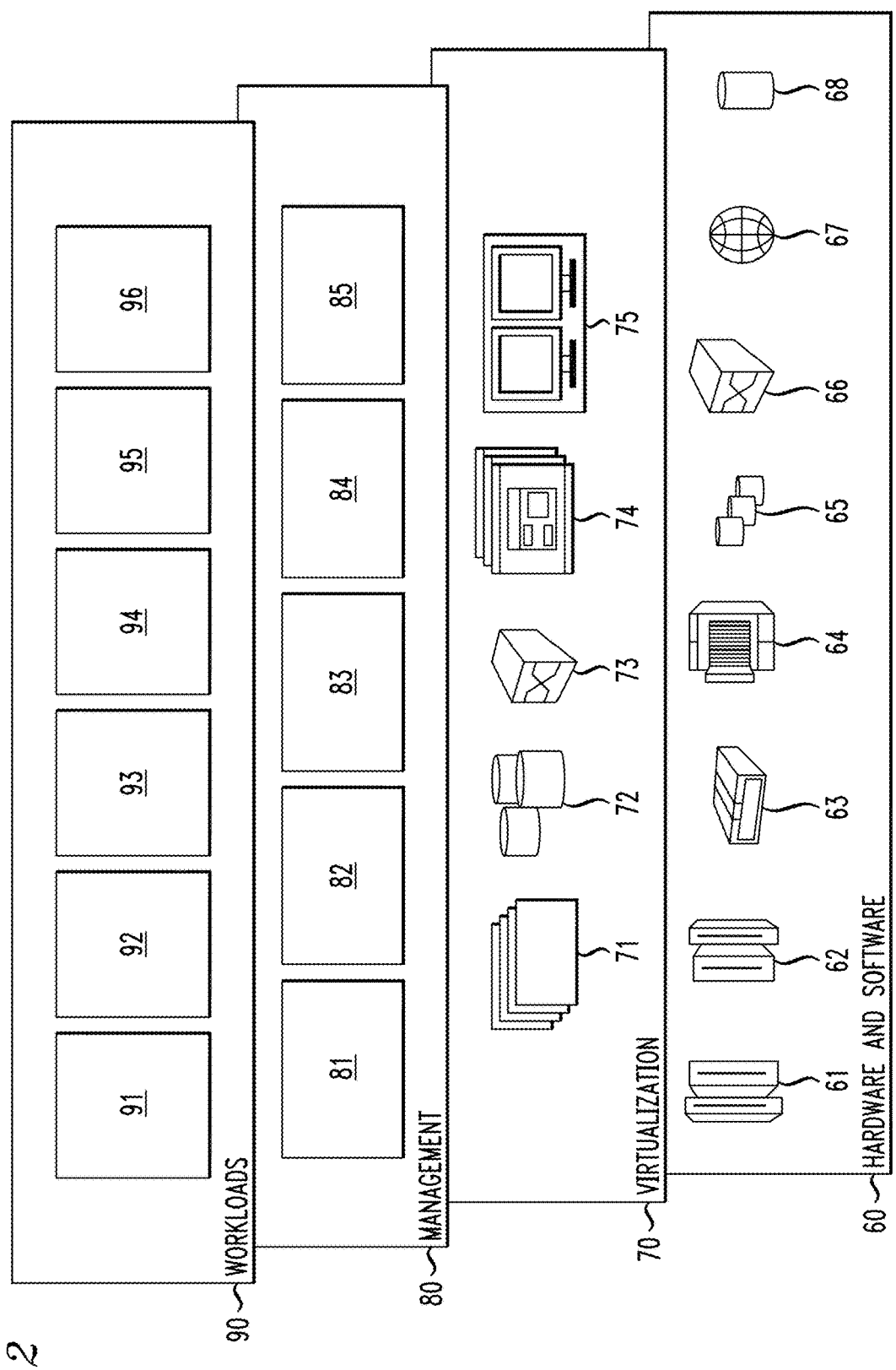
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and at least a portion (e.g., navigator server and/or other server-side EDA components) of a system for register transfer level navigation microservices and instrumentation for cloud-native electronic design automation (EDA) platforms for selective and cross aspect register transfer level (RTL) debug in aspect-oriented hardware designs 96.

As noted, in the microprocessor design cycle, there is an ever increasing need to reduce time from hardware design to general availability of the systems. This motivates minimization of issues and faster turnaround time. Debugging hardware designs is challenging. Next-generation high-performance microprocessors are now designed using a step-wise refinement implementation flow. Here, the normalized (NMZ) register transfer level (RTL) design abstraction, which captures the design intent, goes through a set of automated transforms for the creation of a physical design optimized (PD) RTL. This optimized design then goes through physical design and is ultimately manufactured. Advantageously, one or more embodiments permit the performance of mainline hardware functional debugging on transformation-based refined models of hardware, to enable efficient logic design. One or more embodiments provide register transfer level cloud-native microservices instrumentation for selective cross aspect debug of transformation-based hardware designs, advantageously complementing existing debug search techniques in the present-day hardware design flow.

Indeed, one or more embodiments provide efficient augmentation of register transfer level (RTL) microservices with instrumentation, to enable selective and cross aspect debug in step wise refinement implementation of large-scale hardware designs. One or more embodiments include RTL kernel generation and selective rendering; selective annotation of the RTL parse-tree; microservices for selective access, and online context switch across hardware aspects based on debug; visual constraints—(such as for minimum edge overlap, minimum length of edges, and the like) based rendering; and/or interaction with other hardware debug data microservices (such as logic simulation data, physical design data, and the like). One or more embodiments advantageously enhance the design process for large, powerful modern microprocessors and other complex digital circuits.

As will be appreciated by the skilled artisan, in digital circuit design, register-transfer level (RTL) is a design abstraction which models a synchronous digital circuit in terms of the flow of digital signals (data) between hardware registers, and the logical operations performed on those signals. Transformation modifies the RTL to separate memory (flip flops) from functionality (combinational gates/multiplexers), and allows for the insertion of concerns (such as design for test, clocking, power, and so on).

In the context of transformation-based hardware design, debugging refers to the process of pinpointing functional defects quickly during bring-up ("bring-up" is a phased process whereby an electronics circuit is successively tested, validated, and debugged, iteratively, in order to achieve readiness for manufacture). "Instrumentation" for debugging refers to intrusive logic structures used for pinpointing the defects during debugging.

The next generation of EDA tools is expected to transform current EDA tools and data into a set of cloud-native microservices.

Figure 3:
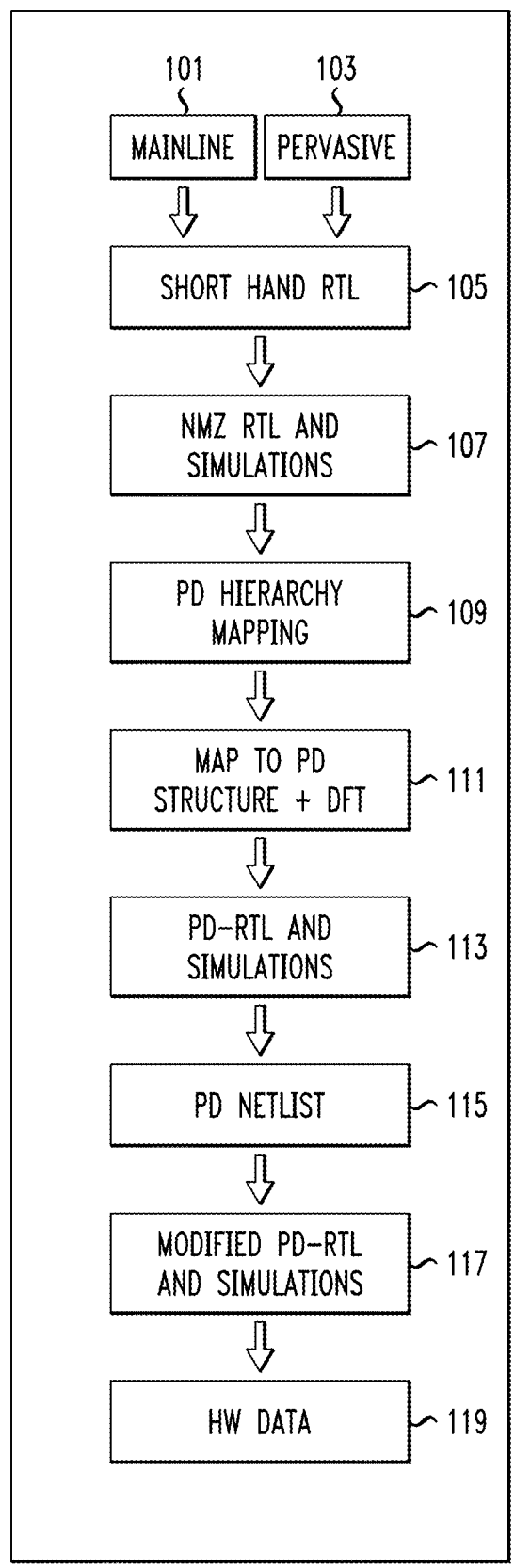
FIG. 3 shows a high-level flow chart of an EDA method, according to an aspect of the invention.

High performance microprocessors are designed using step-wise refinement implementation flow. As seen in FIG. 3, the normalized (NMZ) RTL (which captures design intent) goes through a set of automated transforms to obtain a physical-design-optimized (PD) RTL. The PD RTL then goes through physical design and is manufactured. More specifically, inputs 101 (mainline functionality) and 103 (pervasive recipe file) are used to create short hand RTL 105 which then leads to the normalized (NMZ) register transfer level (RTL) and simulations 107. This is followed by physical design hierarchy mapping 109 and mapping to a physical design structure (plus DFT=design for test) at 111, leading to physical design register transfer level (RTL) and simulations 113, the physical design netlist 115, modified physical design register transfer level (RTL) and simulations 117; and the hardware data 119. The skilled artisan will be familiar with Aspect-Oriented Design (AOD) from, for example, Maya H. Safieddine, Fadi A. Zaraket, Rouwaida Kanj, Ali Elzein, and Wolfgang Roezner, "Methodology for separation of design concerns using conservative RTL Flip-flop inference," In Proc. Design Verification Conf. Exhibit. 2015 March RTL logic design thus takes into account mainline functionality as well as concerns such as design for test, debug, reliability, etc. The above-mentioned intrusive logic structures for debug, as well as such structures for DFT, reliability, and so on, potentially collide with clean functional design and/or corrode functional modularity.

Aspect-Oriented Design (AOD) can be applied to hardware design strategies. AOD makes use of modules that are analogous to the classes in aspect oriented programming and/or object oriented programming. However, there are aspects that cut across modules and frustrate the desire to modularize the problem. This situation can be addressed by defining the aspects/concerns at the RTL level. For example, normalized RTL has concerns woven in, taking into account design and library side files, and results in "concern RTL." Output of the "aspect weaving" remains at the RTL level and is controllable.

One pertinent point addressed by one or more embodiments relates to an RTL design which is automatically being augmented with content to make the RTL generation/coding easier for the hardware/logic designer. Instead of a human writing all the code, a toolchain adds machine-generated code to the code originally written by a human hardware designer. This hybrid code (human written plus machine-generated) represents what is actually manufactured. Before reaching this final stage, the code goes through several transformations, to address different requirements such as clocking, testability, power network, and the like (e.g., within a process such as is depicted in FIG. 3). Each step can be thought of as providing data to access in reverse-engineering of the transformation of the hardware logic, so that it can be re-engineered. Re-engineering is desirable because the automatically-generated code is what is actually going to be implemented using physical logic, i.e., what is actually going to be manufactured/go through physical design flow.

Suppose a "bug" is found and so, debugging is needed, not only for the human-written code, but also for the machine-written code with which the human-written code has been augmented. One or more embodiments address this issue and thus reduce work for the logic designer. In AOD hardware design, the aspects/concerns are separated from the rest of the design issues. Furthermore in this regard, there is typically initial code that describes the logic; then, additions are made to address concern/aspect 1, concern/aspect 2, and so on; proceed to manufacturing only with the final version where all concerns/aspects have been appropriately addressed. The concept of microservices for software design in a cloud-native scenario is analogous. One or more embodiments thus advantageously address a microservices-based architecture for hardware design automation The skilled artisan will appreciate that microservices (or microservices architecture) refers to a cloud native architectural approach in which a single application is composed of many loosely coupled and independently deployable smaller components, or services. These services typically have their own technology stack, inclusive of the database and data management model; communicate with one another over a combination of REST APIs, event streaming, and message brokers; and are organized by capability, with the line separating services often referred to as a bounded context.

The skilled artisan will appreciate that "cloud native" refers to characteristics of how an application is built and deployed; a cloud native application includes discrete, reusable components called microservices, that can integrate into a cloud environment. The microservices act as building blocks and are often packaged in containers. Microservices typically work together as a whole to form an application, yet each can be independently scaled, continuously improved, and quickly iterated through automation and orchestration processes. The flexibility of each microservice advantageously adds to the agility and continuous improvement of cloud-native applications.

Microservices can thus be distinguished from a large monolithic application. Another pertinent point addressed by one or more embodiments relates to the use of a microservices-based EDA tool.

Thus, one or more embodiments are directed to debugging code in a cloud-native client-server EDA architecture. The client is running, e.g., in a web browser on the designer's laptop or desktop workstation. The designer looks at a location in the source RTL code where he suspects the bug may be. However, there is typically a lot of machine-generated code around the suspected bug location that the designer may not understand. Thus, he needs a higher-level abstraction to help him debug the code. It is desired to visualize and to debug to a root-cause point and then delve further into the logic.

Figure 4:
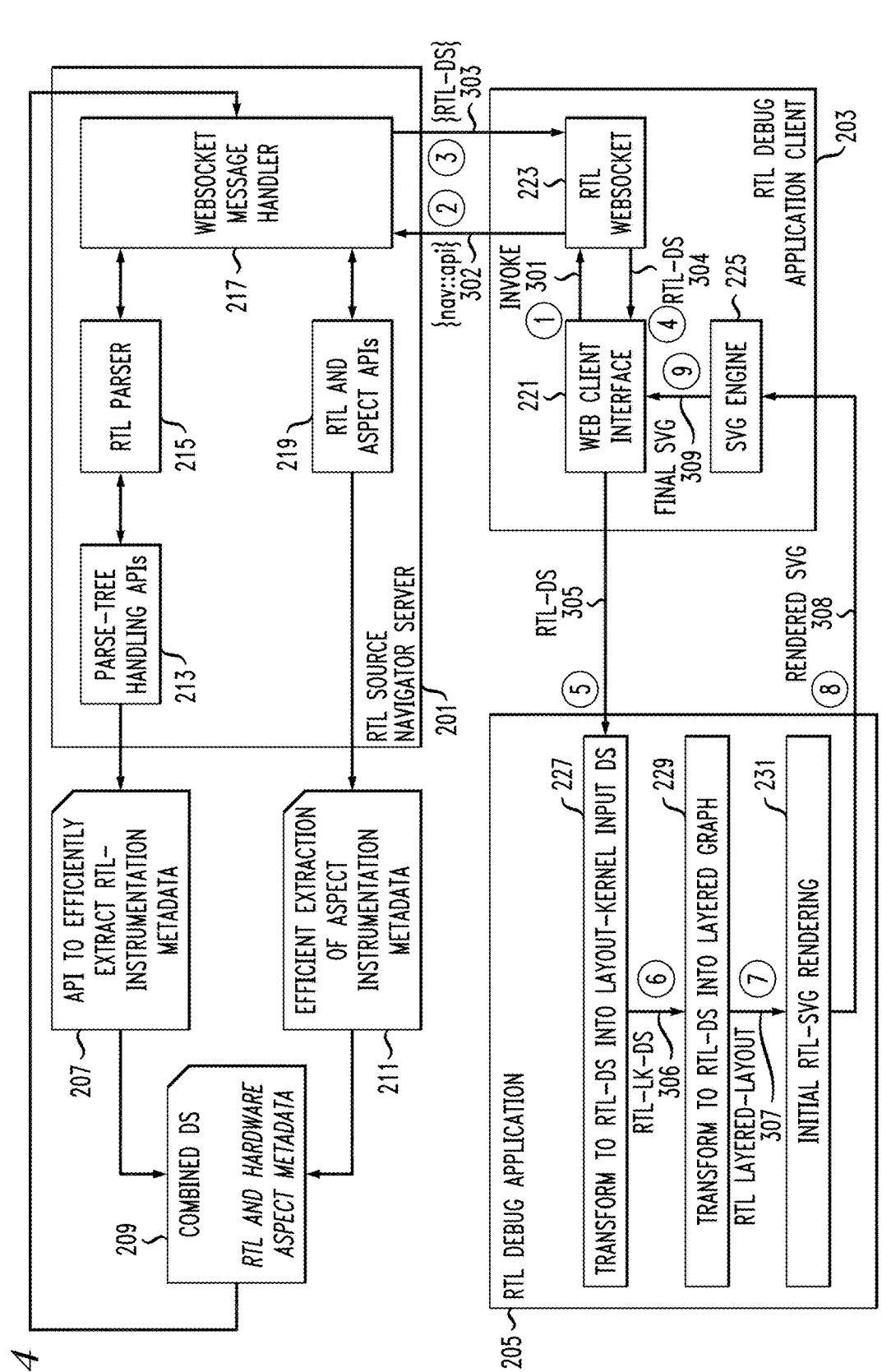
FIG. 4 shows a detailed combined flow chart and block diagram of an EDA method, according to an aspect of the invention.

FIG. 4 shows a navigation process and software architecture that enables such visualization and debugging. It supports the reverse-engineering of the aspects (computer-generated code) as well as the cloud-native microservices. Consider an exemplary client-server architecture for register transfer level navigation microservices and instrumentation for cloud-native EDA platforms for selective and cross aspect RTL debug in aspect-oriented hardware designs. The client makes on-demand requests of the server, incrementally fetching the appropriate amount of data based on the context of the debug. Note the RTL source navigator server 201, RTL debug application client 203, RTL debug application 205, application programming interface (API) 207, combined data store 209, and metadata extraction 211. In a first step 301, web client interface 221 of client 203 invokes the RTL web socket 223 of client 203. In a second step 302 (note that other embodiments can use a different ordering of steps), web socket 223 communicates with web socket message handler 217 of server 201 via a navigator API. In a third step 303, web socket message handler 217 of server 201 replies to RTL web socket 223 of client 203 with appropriate data retrieved from data store 209. In a fourth step 304, RTL web socket 223 of client 203 communicates the data retrieved from data store 209 to web client interface 221 of client 203. WebSocket is a computer communications protocol, providing full-duplex communication channels over a single TCP connection. The WebSocket protocol was standardized by the IETF as RFC 6455 in 2011, and the Web Socket API in Web IDL is being standardized by the W3C.

In a fifth step 305, the data retrieved from data store 209 is communicated to the RTL debug application 205 (which can, for example, run on the client machine). At 227, the RTL debug application transforms the data retrieved from data store 209 into layout kernel input data, which is provided to block 229 in a sixth step 306. At 229, the RTL debug application transforms the layout kernel input data into RTL layered-layout data, which is provided to block 231 in a seventh step 307. At 231, the RTL layered-layout data is transformed into an initial RTL-SVG rendering, provided to the SVG (scalable vector graphics) engine 225 in an eighth step 308. The SVG engine 225 provides the final SVG to the interface 221 in a ninth step 309, for display to the designer.

In one or more embodiments, APIs 207, 211 (for example, implemented using a REST API (also known as RESTful API)) enable the re-engineering of the transformation (machine-generated code) as well as navigation through the design logic. Based on what portion of the code is being debugged, it may be appropriate to show the data in a single chart, or there may be too much data to visualize in a single chart. It may be desirable, for example, to choose with which aspect it is desired to annotate the particular debug. Reference is made to APIs 207, 211 and combined data store 209—one or more embodiments leverage the instrumentation and re-engineering to annotate the client with the data; note data flow from 209 to 217 to 223. One or more embodiments thus augment microservices with instrumentation. The client requests instrumentation; the request goes to server 201 and APIs 207, 211 cooperate with combined data store 209 to return the instrumentation to the server 201 which then returns it back to client 203. The skilled artisan will be familiar with high-level languages like python and other languages suitable for parsers, will be familiar with modern API techniques such as RESTful (Representational state transfer (REST)) APIs, and will be familiar with the syntax of HDL design languages such as Verilog and VHDL, in order to implement the indicated functionality.

Now consider an exemplary manner in which the server 201 interacts with the data store 209 via API 207 and extraction technique 211. As noted, in a second step 302, web socket 223 communicates with web socket message handler 217 of server 201 via a navigator API. Web socket message handler 217 of server 201 communicates the request to combined data store 209 via API 207 and extraction technique 211. In particular, RTL parser 215 parses the request relayed by handler 217 and provides the parsed request to parse-tree handling APIs 213 and then to API 207. API 207 permits efficient extraction of RTL-instrumentation metadata from data store 209. Web socket message handler 217 also communicates the received request to RTL and aspect APIs 219 and extraction technique 211 permits efficient extraction of aspect instrumentation metadata from data store 209. The combined metadata is returned to handler 217, and as noted, in step 303, web socket message handler 217 of server 201 replies to RTL web socket 223 of client 203 with appropriate data (e.g., instrumentation) retrieved from data store 209. Note that the "parse tree" mentioned elsewhere herein refers, for example, to activities within element 201 in FIG. 4, wherein the code of the hardware logic is converted into a computer science data structure so that the server and client can understand it.

One or more embodiments provide an at least partially microservices-based platform, while being efficient and scalable. One or more embodiments provide an identification service for RTL structural and logical constructs; for example, with techniques for RTL kernel generation and selective rendering. One or more embodiments include an RTL-parse microservice step, which is responsible for analyzing and elaborating; provide selective annotation of the parse-tree; and provide APIs for selective access to the parse-tree, and for switching context across hardware aspects.

Furthermore, one or more embodiments provide debug correspondence microservice instrumentation for selective nodes, with the extracted information from RTL to augment the microservices, and/or for applicable element(s) in the graph. Even further, one or more embodiments provide the capability to selectively lay out kernel information, with augmented information; for example, with support for optimizing for constraints based on use-case, such as minimum edge crossings/overlap, minimum length of edges, and the like. Yet further, one or more embodiments provide additional instrumentation for efficient large-scale debug, including selective logic cone debug; and/or model transformations based on RTL aspect debug context. One or more embodiments are compatible with, and can make use of, existing techniques for DOM (document object model) cartesian coordinates, SVG cartesian coordinates, matrix factoring, and the like.

One or more embodiments are applicable to the case where the data structure of an RTL as a graph is available. This graph represents different data-paths of a module from primary-inputs (PIs) to primary-outputs (POs). While the PIs act as the sources of the graph, the POs represent the sinks. The RTL constructs, such as assignment-statements and instantiated modules, are nodes of the graph with the edges being defined by assignments and port maps. See FIGS. 6 and 7. An assignment statement of the following form will be represented by one node in the graph with inward edges labeled as sig_a, sig_b and sig_c, with one outward edge labeled as sig_x:

sig_x≤sig_a and (sig_b or sig_c)

In one or more embodiments, an instance in an RTL is one node in the graph with its in- and out-port maps acting as inward and outward edges respectively. The connections/edges between these nodes are formed by the internal signals derived within the RTL. The internal signals can connect an assignment-statement-node to an instance-node and/or an instance-node to an assignment-statement-node based on the data-flow defined in the RTL.

One or more embodiments provide the ability for augmenting register transfer level (RTL) cloud-native microservices with instrumentation for performing selective cross aspect (step-wise) debugging of transformation-based hardware designs. More specifically, one or more embodiments provide specific capabilities for: generating and selectively rendering an RTL kernel, and selectively annotating an RTL parse-tree using an RTL parser; allowing microservices to selectively access, and switch across online context hardware aspects based on debug, and to generate visual constraints (such as for minimum edge overlap, minimum length of edges, and the like) based rendering; and allowing interaction with other hardware debug data microservices, such as logic simulation data and/or physical design data.

The final graphical rendering can display, for example, gates, pins, and connections; provision can be made to click on and enlarge portions of the circuit; and provision can be made for displaying the corresponding VHDL (or other RTL source code) when a portion of the design is clicked on.

Figure 5:
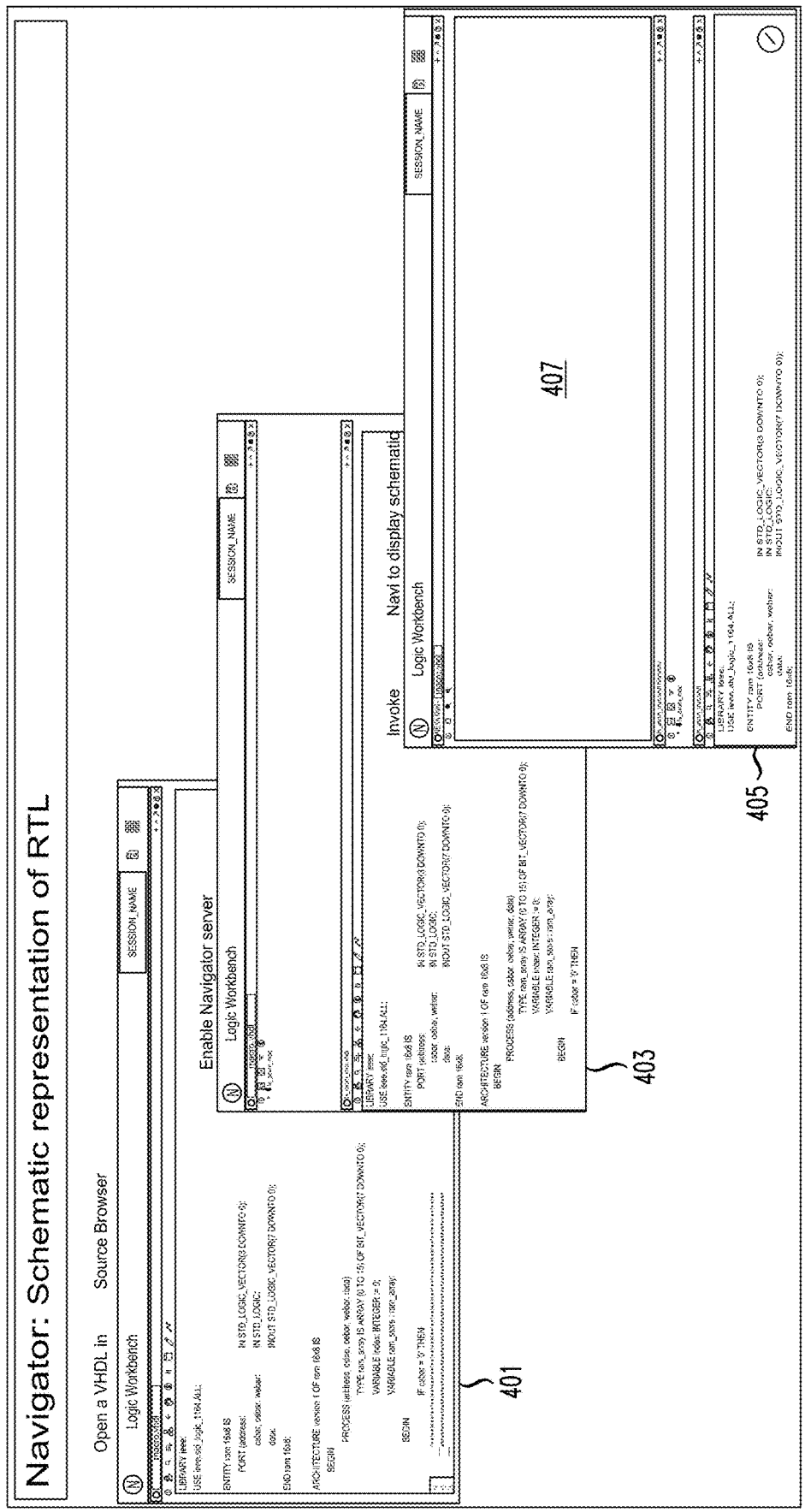
FIGS. 5-7 show aspects of a graphical user interface (GUI) according to an aspect of the invention.
Figure 6:
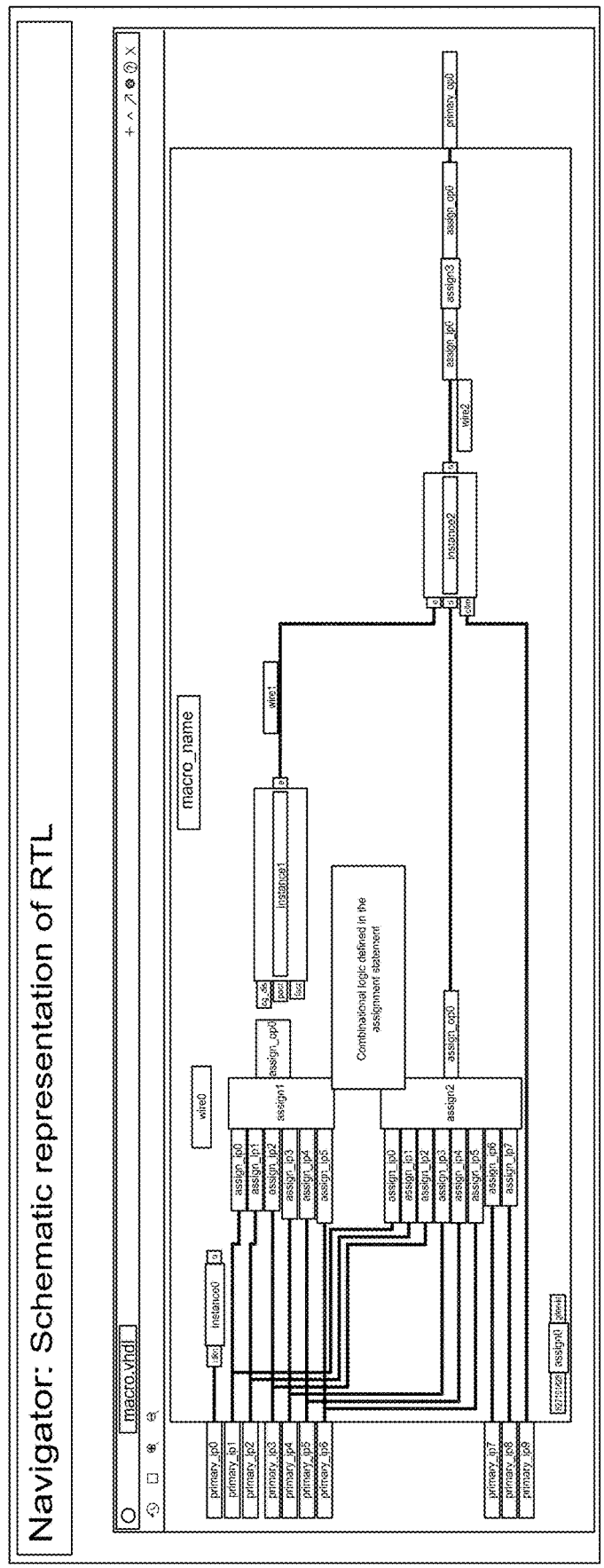
Figure 7:
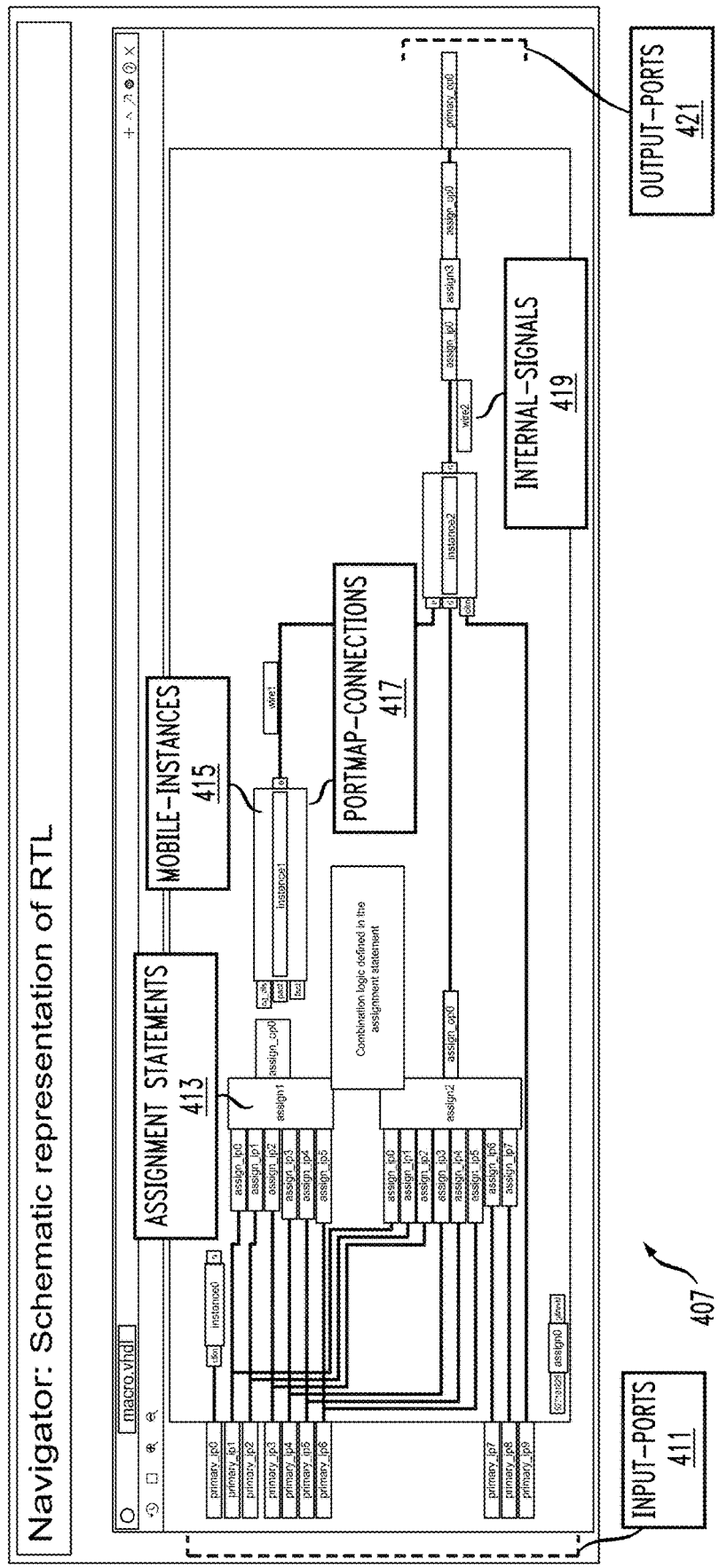

Furthermore in this regard, FIG. 5 shows example screens 401, 403, 405. In screen 401, open RTL source code (e.g., in VHDL) in a browser of client 203. The designer notes a possible bug and desires to do a "deep dive" to debug the code. In view 403, the designed enables the navigator server 201. In view 405, the designer invokes the navigator to display a schematic 407 (e.g., drop-down tree-like structure as seen in FIG. 6). The tree structure(s) essentially provide a schematic tree-like visualization of the RTL source code (in the example, for a certain macro called "macro_name"). The designer can navigate deeper into a certain part of the tree, as desired. FIG. 6 shows an exemplary initial screen when the schematic display is invoked, while FIG. 7 shows an annotated tree including input ports 411, assignment statements 413, module instances 415 (e.g., instance0, instance1, instance2); port map connections 417; internal signals 419 (e.g., wire1, wire2); and output ports 421. Thus, the RTL source code is converted to a logic diagram and displayed in a form which facilitates debugging.

Given the discussion thus far, it will be appreciated that an exemplary method for increasing the efficiency of electronic design automation, according to an aspect of the invention, includes, at step 302, a register transfer level debug application client entity (e.g., client 203 plus application 205) requesting, from a register transfer level source navigator server 201, combined register transfer level and hardware aspect metadata including debug instrumentation; at step 303, the register transfer level debug application client entity receiving, from the register transfer level source navigator server, the combined register transfer level and hardware aspect metadata including the debug instrumentation. A further step (e.g., 227, 229) includes the register transfer level debug application client entity transforming the combined register transfer level and hardware aspect metadata including the debug instrumentation. An even further step includes the register transfer level debug application client entity rendering (e.g., with engine 225) the transformed combined register transfer level and hardware aspect metadata including the debug instrumentation.

In one or more embodiments, in the requesting and receiving steps, the combined register transfer level and hardware aspect metadata characterizes a register transfer level (e.g., VHDL, Verilog) abstraction of an integrated circuit including human-written code defining a logic design and machine-generated code addressing design aspects. Thus, for example, aspects of the method can be applied at an intermediate stage in the process of FIG. 3.

In one or more embodiments, in the requesting and receiving steps, the human-written code defining the logic design separately describes memory and combinatorial logic gates of the logic design.

In one or more embodiments, in the requesting and receiving steps, in the machine-generated code addressing the design aspects, the design aspects include one or more of timing closure, power budget, design for test, reliability, and built-in self-test.

The transforming includes, for example, transforming for graphical rendering and the rendering includes, for example, rendering graphically as a tree structure. See FIGS. 6 and 7, for example.

In one or more embodiments, the debug application client entity includes a debug application client 203 (e.g. running in a browser on a client machine) and a debug application (e.g. app running in memory on the client machine and interfacing with the client executing in the browser). In such instances, for example, the debug application client 203 requests the combined register transfer level and hardware aspect metadata at 302; the debug application client receives the combined register transfer level and hardware aspect metadata including the debug instrumentation at 303; the register transfer level debug application 205 transforms the combined register transfer level and hardware aspect metadata including the debug instrumentation (e.g., 227, 229); and the register transfer level debug application client 203 renders the transformed combined register transfer level and hardware aspect metadata including the debug instrumentation (e.g. using engine 225).

One or more embodiments further include debugging a putative design based on the rendering of the transformed combined register transfer level and hardware aspect metadata. Fabrication of an integrated circuit in accordance with the debugged putative design can then be facilitated; for example, send the design to a foundry which then fabricates the circuit.

One or more embodiments thus contemplate making at least one design change to a putative circuit design based on the debugging.

One or more embodiments further contemplate updating the putative circuit design to reflect the at least one design change; and fabricating a physical integrated circuit in accordance with the updated circuit design.

For example, referring to FIGS. 3 and 9-11 discussed elsewhere herein, render the updated circuit design in a design language; and prepare a layout based on the updated circuit design rendered in the design language. Instantiate the layout as a design structure. The physical integrated circuit is then fabricated in accordance with the design structure.

Accordingly, in one or more embodiments, the layout is instantiated as a design structure. See discussion of FIG. 9. A physical integrated circuit is then fabricated in accordance with the design structure. See again discussion of FIG. 9. Refer also to FIG. 10. Once the physical design data is obtained, based, in part, on the analytical processes described herein, an integrated circuit designed in accordance therewith can be fabricated according to known processes that are generally described with reference to FIG. 10. Generally, a wafer with multiple copies of the final design is fabricated and cut (i.e., diced) such that each die is one copy of the integrated circuit. At block 3010, the processes include fabricating masks for lithography based on the finalized physical layout. At block 3020, fabricating the wafer includes using the masks to perform photolithography and etching. Once the wafer is diced, testing and sorting each die is performed at 3030 to filter out any faulty die.

One or more embodiments include a computer including a memory (e.g. 30, discussed elsewhere); a non-transitory computer readable medium (e.g. 34, discussed elsewhere) including computer executable instructions; and at least one processor 16, coupled to the memory and the non-transitory computer readable medium, and operative to execute the instructions to be operative to perform any one, some, or all of the method steps described above. The instructions on the medium can also configure the processor to instantiate appropriate software components as seen in FIG. 4 (e.g., instantiating a register transfer level debug application client entity such as 203, 205). In one or more embodiments, the performance of this computer implementing EDA is improved, for example, by more efficient debugging.

Figure 9:
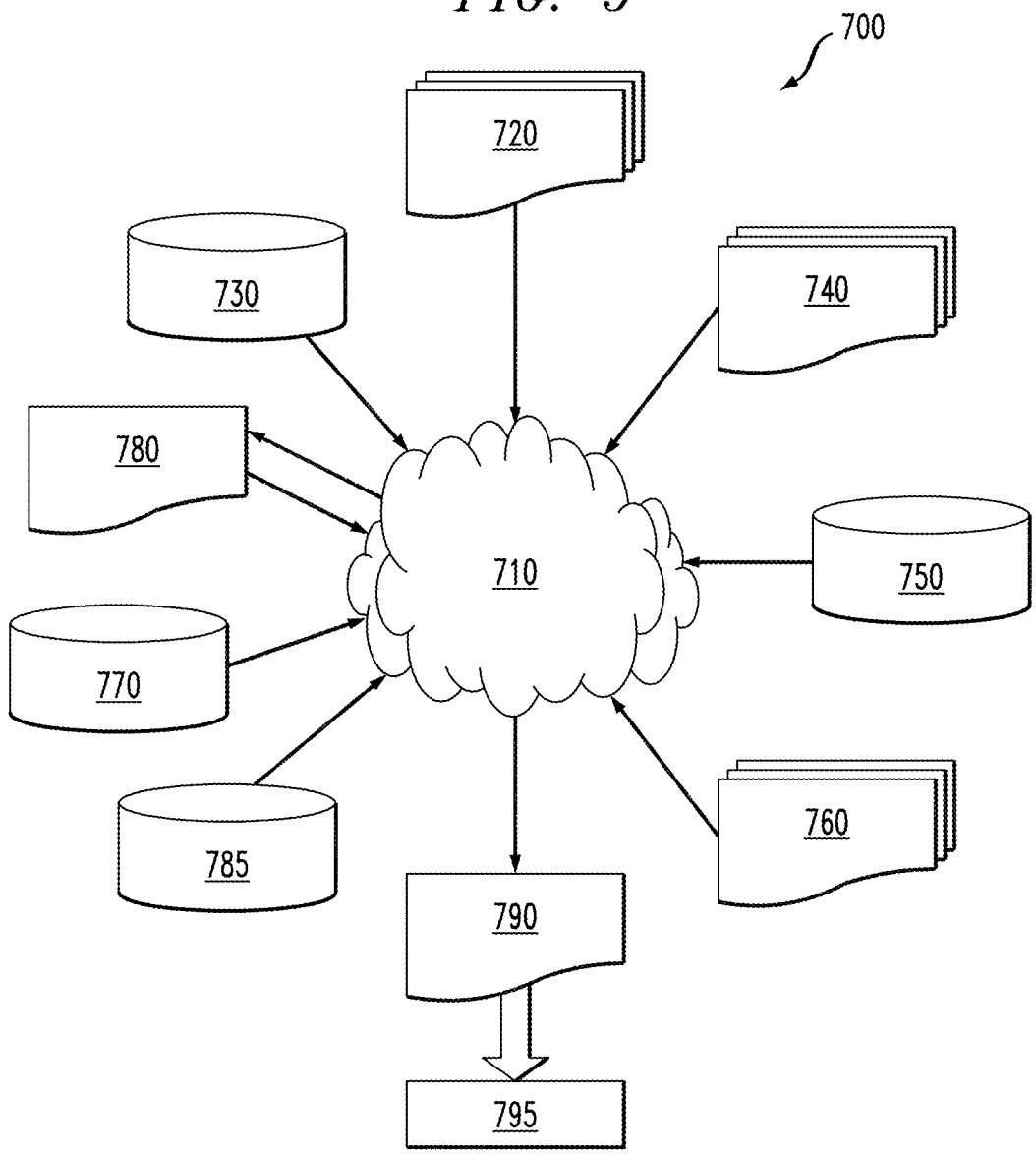
FIG. 9 is a flow diagram of a design process used in semiconductor design, manufacture, and/or test.
Figure 10:
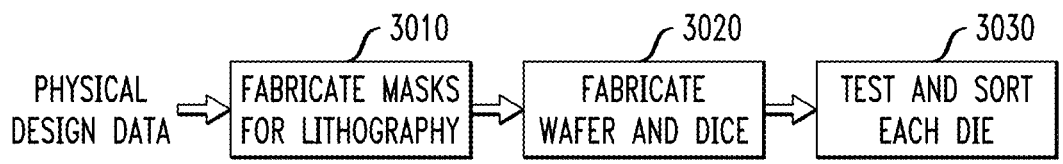
FIG. 10 shows further aspects of IC fabrication from physical design data.

Furthermore, referring to FIG. 9, in one or more embodiments the at least one processor is operative to generate a design structure for the circuit design in accordance with the analysis, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure (e.g. over interfaces 22 or adapter 20).

Figure 11:
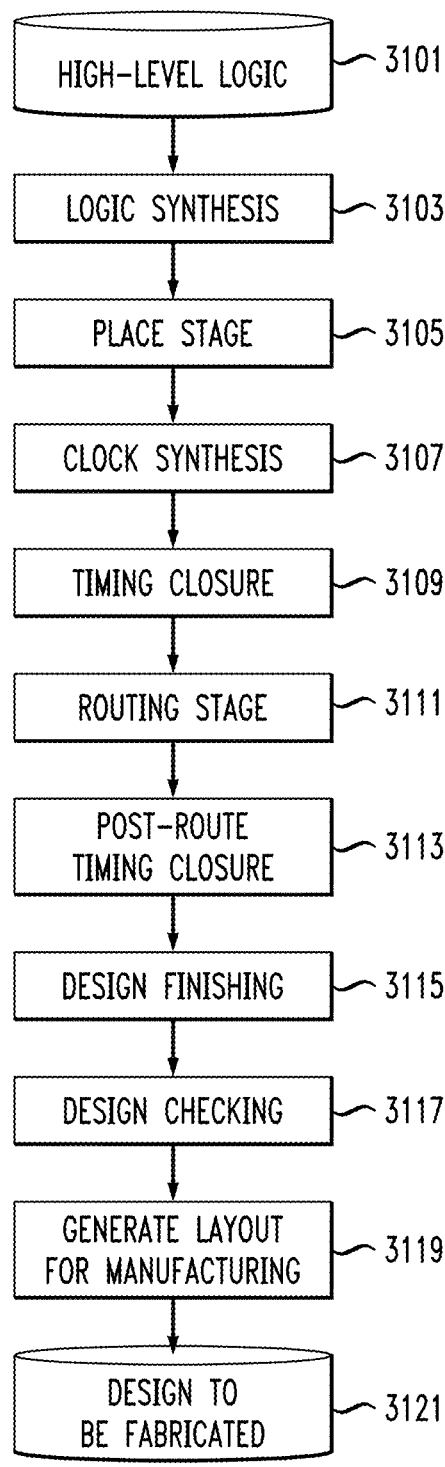
FIG. 11 shows an exemplary high-level Electronic Design Automation (EDA) tool flow, within which aspects of the invention can be employed.

FIG. 11 depicts an example high-level Electronic Design Automation (EDA) tool flow, which is responsible for creating an optimized microprocessor (or other IC) design to be manufactured. A designer could start with a high-level logic description 3101 of the circuit (e.g. VHDL or Verilog). The logic synthesis tool 3103 compiles the logic, and optimizes it without any sense of its physical representation, and with estimated timing information. The placement tool 3105 takes the logical description and places each component, looking to minimize congestion in each area of the design. The clock synthesis tool 3107 optimizes the clock tree network by cloning/balancing/buffering the latches or registers. The timing closure step 3109 performs a number of optimizations on the design, including buffering, wire tuning, and circuit repowering; its goal is to produce a design which is routable, without timing violations, and without excess power consumption. The routing stage 3111 takes the placed/optimized design, and determines how to create wires to connect all of the components, without causing manufacturing violations. Post-route timing closure 3113 performs another set of optimizations to resolve any violations that are remaining after the routing. Design finishing 3115 then adds extra metal shapes to the netlist, to conform with manufacturing requirements. The checking steps 3117 analyze whether the design is violating any requirements such as manufacturing, timing, power, electromigration (e.g., using techniques disclosed herein) or noise. When the design is clean, the final step 3119 is to generate a layout for the design, representing all the shapes to be fabricated in the design to be fabricated 3121.

Figure 8:
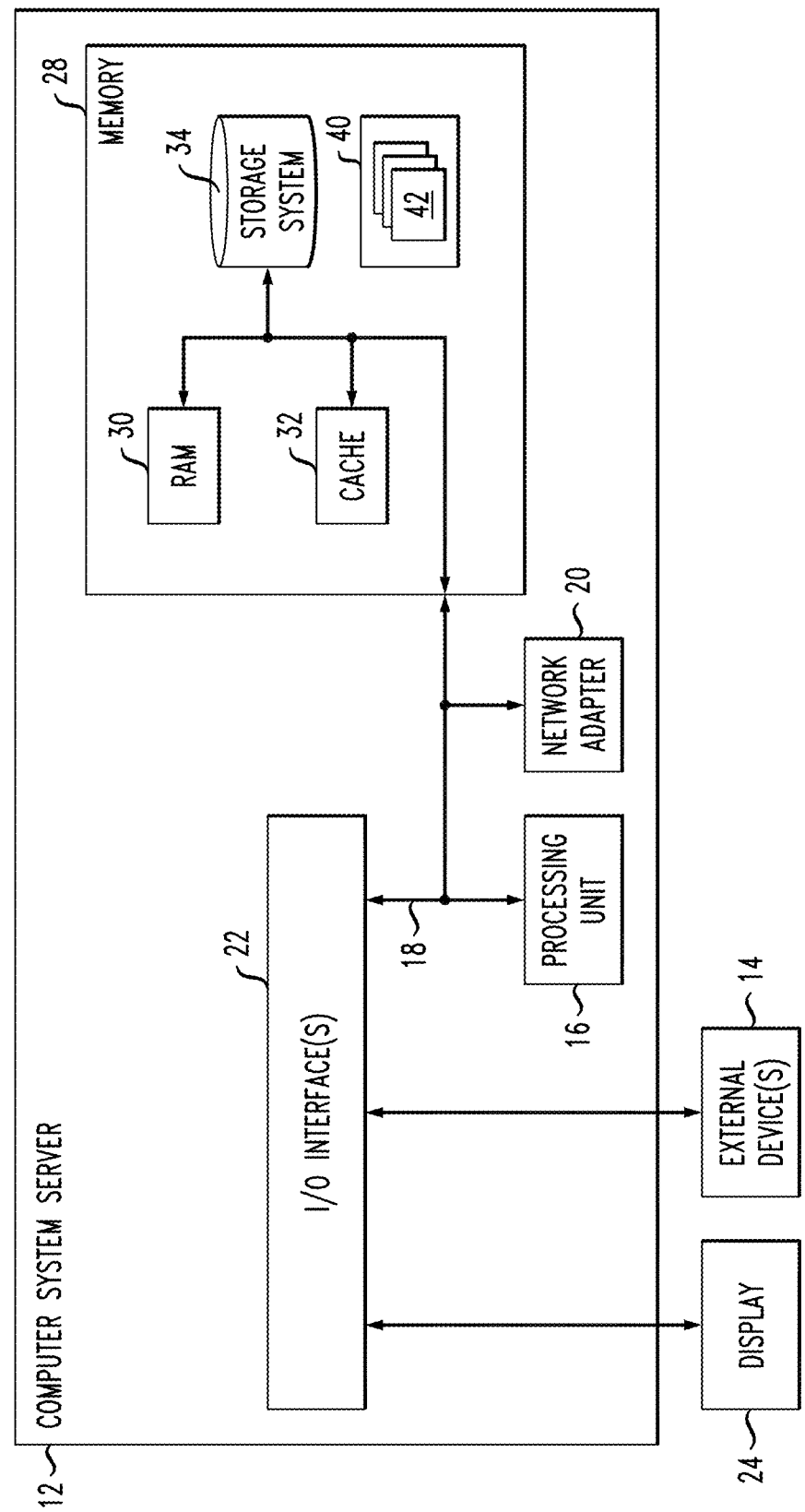
FIG. 8 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention; it is referred to herein as a cloud computing node but is also representative of a server, general purpose-computer, etc. which may be provided in a cloud or locally.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

One or more embodiments integrate the characterizing and simulating techniques herein with semiconductor integrated circuit design simulation, test, layout, and/or manufacture. In this regard, FIG. 9 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those that can be analyzed using techniques disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 9 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc. Improved latch tree synthesis can be performed as described herein.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for increasing the efficiency of electronic design automation, the method comprising:
   a register transfer level debug application client entity requesting, from a register transfer level source navigator server, combined register transfer level and hardware aspect metadata including debug instrumentation;
   the register transfer level debug application client entity receiving, from the register transfer level source navigator server, the combined register transfer level and hardware aspect metadata including the debug instrumentation;
   the register transfer level debug application client entity transforming the combined register transfer level and hardware aspect metadata including the debug instrumentation; and
   the register transfer level debug application client entity rendering the transformed combined register transfer level and hardware aspect metadata including the debug instrumentation, wherein, in the requesting and receiving steps, the combined register transfer level and hardware aspect metadata characterizes a register transfer level abstraction of an integrated circuit including human-written code defining a logic design and machine-generated code addressing design aspects to provide data to enable reverse-engineering of the transformation of the hardware logic and, subsequently, re-engineering of the reverse-engineered design.

2. The method of claim 1, wherein, in the requesting and receiving steps, the human-written code defining the logic design separately describes memory and combinatorial logic gates of the logic design.

3. The method of claim 2, wherein, in the requesting and receiving steps, in the machine-generated code addressing the design aspects, the design aspects include one or more of timing closure, power budget, design for test, reliability, and built-in self-test.

4. The method of claim 2, wherein the transforming comprises transforming for graphical rendering and wherein the rendering comprises rendering graphically as a tree structure.

5. The method of claim 2, wherein the register transfer level debug application client entity comprises a debug application client and a debug application, and wherein:
said debug application client requests the combined register transfer level and hardware aspect metadata;
said debug application client receives the combined register transfer level and hardware aspect metadata including the debug instrumentation;
said register transfer level debug application client entity transforms the combined register transfer level and hardware aspect metadata including the debug instrumentation; and
the register transfer level debug application client entity renders the transformed combined register transfer level and hardware aspect metadata including the debug instrumentation.

6. The method of claim 2, further comprising debugging a putative design based on the rendering of the transformed combined register transfer level and hardware aspect metadata.

7. The method of claim 6, further comprising facilitating fabrication of the integrated circuit in accordance with the debugged putative design.

8. A computer comprising:
a memory;
a non-transitory computer readable medium including computer executable instructions; and
at least one processor, coupled to the memory and the non-transitory computer readable medium, and operative to execute the instructions to be operative to increase the efficiency of electronic design automation by:
instantiating a register transfer level debug application client entity;
the register transfer level debug application client entity requesting, from a register transfer level source navigator server, combined register transfer level and hardware aspect metadata including debug instrumentation;
the register transfer level debug application client entity receiving, from the register transfer level source navigator server, the combined register transfer level and hardware aspect metadata including the debug instrumentation;
the register transfer level debug application client entity transforming the combined register transfer level and hardware aspect metadata including the debug instrumentation; and
the register transfer level debug application client entity rendering the transformed combined register transfer level and hardware aspect metadata including the debug instrumentation, wherein, in the requesting and receiving steps, the combined register transfer level and hardware aspect metadata characterizes a register transfer level abstraction of an integrated circuit including human-written code defining a logic design and machine-generated code addressing design aspects to provide data to enable reverse-engineering of the transformation of the hardware logic and, subsequently, re-engineering of the reverse-engineered design.

9. The computer of claim 8, wherein the human-written code defining the logic design separately describes memory and combinatorial logic gates of the logic design.

10. The computer of claim 9, wherein in the machine-generated code addressing the design aspects, the design aspects include one or more of timing closure, power budget, design for test, reliability, and built-in self-test.

11. The computer of claim 9, wherein the transforming comprises transforming for graphical rendering and wherein the rendering comprises rendering graphically as a tree structure.

12. The computer of claim 9, wherein the register transfer level debug application client entity comprises a debug application client and a debug application, and wherein:
said debug application client requests the combined register transfer level and hardware aspect metadata;
said debug application client receives the combined register transfer level and hardware aspect metadata including the debug instrumentation;
said register transfer level debug application client entity transforms the combined register transfer level and hardware aspect metadata including the debug instrumentation; and
the register transfer level debug application client entity renders the transformed combined register transfer level and hardware aspect metadata including the debug instrumentation.

13. The computer of claim 9, wherein the at least one processor is further operative to execute the instructions to be operative to debug a putative design based on the rendering of the transformed combined register transfer level and hardware aspect metadata.

14. The computer of claim 13, wherein the at least one processor is further operative to execute the instructions to be operative to facilitate fabrication of the integrated circuit in accordance with the debugged putative design.

15. A computer program product for increasing the efficiency of electronic design automation, the computer program product comprising a computer readable storage medium having program instructions embodied therewith, the program instructions executable by a computer to cause the computer to:
instantiate a register transfer level debug application client which:
requests, from a register transfer level source navigator server, combined register transfer level and hardware aspect metadata including debug instrumentation;
receives, from the register transfer level source navigator server, the combined register transfer level and hardware aspect metadata including the debug instrumentation;
transforms the combined register transfer level and hardware aspect metadata including the debug instrumentation; and
renders the transformed combined register transfer level and hardware aspect metadata including the debug instrumentation, wherein, in the requesting and receiving steps, the combined register transfer level and hardware aspect metadata characterizes a register transfer level abstraction of an integrated circuit including human-written code defining a logic design and machine-generated code addressing design aspects to provide data to enable reverse-engineering of the transformation of the hardware logic and, subsequently, re-engineering of the reverse-engineered design.

16. The computer program product of claim 15, wherein the human-written code defining the logic design separately describes memory and combinatorial logic gates of the logic design.

17. The computer program product of claim 16, wherein in the machine-generated code addressing the design aspects, the design aspects include one or more of timing closure, power budget, design for test, reliability, and built-in self-test; the transforming comprises transforming for graphical rendering; and the rendering comprises rendering graphically as a tree structure.

\* \* \* \* \*